United States Patent
Regupathy et al.

(10) Patent No.: US 12,373,370 B2
(45) Date of Patent: Jul. 29, 2025

(54) DYNAMICALLY INFLUENCING BANDWIDTH

(71) Applicant: Intel Corporation, Santa Clara, CA (US)

(72) Inventors: Rajaram Regupathy, Bangalore (IN); Saranya Gopal, Bangalore (IN); Khaled Almahallawy, Hillsboro, OR (US); Gaurav Singh, Bangalore (IN); Abhilash K V, Bangalore (IN); Reuven Rozic, Binyamina (IL); Paul Crutcher, Welches, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 17/484,625

(22) Filed: Sep. 24, 2021

(65) Prior Publication Data

US 2023/0096774 A1    Mar. 30, 2023

(51) Int. Cl.
| | |
|---|---|
| *G06F 13/38* | (2006.01) |
| *G06F 11/30* | (2006.01) |
| *G06F 11/32* | (2006.01) |
| *G06F 13/40* | (2006.01) |
| *G06F 13/42* | (2006.01) |

(52) U.S. Cl.
CPC ........ *G06F 13/385* (2013.01); *G06F 11/3027* (2013.01); *G06F 11/328* (2013.01); *G06F 13/4022* (2013.01); *G06F 13/4282* (2013.01); *G06F 2213/0042* (2013.01)

(58) Field of Classification Search
CPC .................................................. G06F 11/3027
See application file for complete search history.

(56) References Cited

U.S. PATENT DOCUMENTS

| | | | | |
|---|---|---|---|---|
| 6,237,036 | B1 * | 5/2001 | Ueno .................... | H04L 63/101 |
| | | | | 709/201 |
| 2019/0121764 | A1 * | 4/2019 | Regupathy .............. | H04L 41/12 |

OTHER PUBLICATIONS

Rahman Ismail, "USB4™ System Overview", USB Developer Days 2019, Taipei, Taiwan, Nov. 19, 2019, 30 pages.

(Continued)

*Primary Examiner* — Henry Tsai
*Assistant Examiner* — Juanito C Borromeo
(74) *Attorney, Agent, or Firm* — Schwabe, Williamson & Wyatt, P.C.

(57) ABSTRACT

Buses such as USB4 or Thunderbolt 4 buses may allow for device combinations that actually cannot be accommodated on the bus. A monitoring component, e.g., software and/or hardware component, such as an Operating System (OS) policy manager, may monitor a bus for events identifying changes to devices on the bus. The monitoring component may influence mode changes to hardware/software, such as to the USB configuration, device driver settings, attached device settings, and/or settings for devices attaching to the bus. Influenced changes facilitate accommodating changes to the devices attached to the bus. For example, if a display is attached and it would exceed available bus bandwidth, cause an excess system load, or cause some other problem, rather than fail to enumerate the display, instead hardware and/or software associated with the bus may be influenced to result in a resolution reduction for the display to accommodate it attaching to the bus.

22 Claims, 5 Drawing Sheets

(56) References Cited

OTHER PUBLICATIONS

Bob Dunstan et al., "USB Power Delivery," USV Developer Days 2019, Taipei, Taiwan, Nov. 19, 2019, 104 pages.
Brad Saunders, ""USB Power Delivery Specification" Adopters Agreement", Jul. 9, 2012, 1 page.
Apple Inc et al., "Universal Serial Bus 4 (USB4™) Specification", May 19, 2021, 595 pages.

* cited by examiner

DYNAMICALLY INFLUENCING BANDWIDTH

TECHNICAL FIELD

The present disclosure relates to maximizing how many devices can attach to a converged-IO bus tunneling multiple protocols on the bus, and more specifically to dynamically influencing settings of attached or attaching devices to accommodate an attaching device.

BACKGROUND AND DESCRIPTION OF RELATED ART

The Universal Serial Bus (USB) Implementers Forum (IF), Inc. (USB-IF) is a consortium of companies that developed and/or support adopting USB technology. Their website states, at Internet Uniform Resource Locator (URL) www.usb.org, the USB-IF "facilitates the development of high-quality compatible USB peripherals (devices), and promotes the benefits of USB and the quality of products that have passed compliance testing." Multiple USB implementations have been standardized by the consortium over the years, a more recent one being referred to as USB4 and Thunderbolt 4 (developed by Intel Corporation and adopted by the USB-IF), both of which provide up to 40 Gbps peak data throughput, and many converged-IO features. There are multiple different versions/features provided by different USB versions. Thunderbolt 4 can be generally thought of as a comprehensive implementation of USB4 where all high performance features/options are provided/enabled. References to USB4/Thunderbolt 4 will be used interchangeable herein. One skilled in the art will appreciate the standards are different, but may be treated as roughly equivalent when considered with an expectation that all features of the USB4/Thunderbolt 4 specifications are enabled. Therefore while the following may make reference to one or the other standard, it should not be interpreted as an exclusion of the other, unless context requires the distinction or an explicit statement to that effect is made.

USB4/Thunderbolt 4 technology provides a connection-oriented tunneling architecture allowing combining multiple protocols. For example, USB, Peripheral Component Interconnect Express (PCIe), and DisplayPort (DP) onto a single physical interface so the total speed of the USB fabric may be shared among USB, PCIe and DP endpoints. USB4 link bandwidth is managed by a Connection Manager (CM). Typically the CM reserves 10% of USB bandwidth as guard bandwidth for link overhead and for non-isochronous tunneled protocol paths. The remaining 90% bandwidth is allocated entirely or partially to isochronous tunneled protocols managed by the CM. Thus, for example, the maximum available bandwidth for a DP adapter is 17 Gbps on a 20 Gbps Thunderbolt (TBT) link (2 lane mode), and 36 Gbps on a 40 Gbps TBT link (4 lane mode). Note, however, legacy display connectors such as HDMI, or DisplayPort, have dedicated bandwidth and IO. While this is intended to provide a good experience to an end user, dedicated bandwidth with a USB tunneling architecture can conflict with daisy-chaining multiple monitors as the same bandwidth, e.g., 17 Gbps or 36 Gbps, must in theory accommodate additional monitors. However, a typical monitor is operating at 4K (if not more), and each monitor would therefore require approximately 16 GPs of bus bandwidth. Even if one is using a bus providing 4 lane 40 Gbps bandwidth, notwithstanding USB4/Thunderbolt 4 allowing for three daisy-chained monitors, the bus cannot accommodate three 4K monitors as that would require at least 3×16=48 Gps bandwidth to be available on a 40 Gbps bus.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

Various devices will be discussed below operating in the context of the USB4 and/or Thunderbolt 4 standards. USB4 is a standard provided by the USB-IF. The Thunderbolt 4 standard was developed by Intel Corporation and rights to use underlying Thunderbolt 3 technology was given by Intel to the USB-IF royalty free. USB4 and Thunderbolt 4 can be considered roughly equivalent, with a distinction being Thunderbolt 4 and USB4 have different minimum qualifying implementations (Thunderbolt 4 requires a higher-end minimal feature set). It will be appreciated USB4/Thunderbolt 4 are presented by way of example only and other buses may be used if they provide equivalent functionality and/or capabilities in accord with the teachings herein. It is assumed USB4 is configured with high performance options such that USB4 and Thunderbolt 4 may be considered roughly interchangeable; both will simply be referred to herein as USB unless making a distinction between them is needed.

The USB-IF introduced the USB Power Delivery (USB-PD) Specification, which introduces the concept of a Programmable Power Supply (PPS), where a Power Data Object (PDO) is used by a power supply whose output voltage can be programmatically incrementally adjusted over its advertised range. The USB-PD Specification recommends programmatically increasing or decreasing power shall be interactive with system and device policy, but does not define parameters to the policy and leaves implementation to system designers and peer systems. We will assume that devices attached to a USB bus, including a secondary device providing power to bus devices, which may include a host (e.g., computer) have a Device Policy Management (DPM) that's enhanced to allow bus devices to share information, e.g., between themselves, with a host device, with a secondary device powering bus devices, etc. This will enable one or more devices to acquire ecosystem knowledge of other bus devices and enable one or more device to influence the operational state of other devices on the bus.

The USB Standard has supported DisplayPort (DP) Multi-Stream Transport (MST), which is one exemplary standard for attaching multiple display devices to a USB. The current USB4/Thunderbolt 4 Standards provide a connection-oriented tunneling architecture allowing combining multiple protocols, such as USB, Peripheral Component Interconnect Express (PCIe), and DisplayPort (DP) onto a single physical interface, where all endpoints share the USB fabric. Various device connection topologies are possible. It will be appreciated different devices may be coupled to a USB, where any device may be designated the host system, e.g., a laptop computer, desktop computer, server, etc. Other devices may be attached as well, such as a hub (docking solution), which may provide power and data connectivity over the USB to the host system or other devices attached to the USB. Thus, for example, in one configuration, multiple devices, such as a computer, and multiple monitors, may connect to the hub, forming a star formation with the hub at the center. Alternatively, the USB Standard provides for a daisy-chain monitor topology, e.g., computer to hub to monitor to another monitor.

In various embodiments, the DisplayPort (DP) protocol is tunneled over the USB fabric. To the DP source, the USB fabric and the adapters are either transparent or act as an LTTPR (Link-Training Tunable PHY Repeater). DP tunneling supports both the SST and MST modes and 1, 2, and 4 lanes at multiple rates, e.g, reduced bit rate (RBR), and multiple levels of high bit rates (successive DP standards have introduced increasingly faster high bitrates, e.g., HBR, HBR2, and HBR3). At the DP Adapter Layer, the DP IN Adapter packs the DP video stream into tunnel packets, and the DP OUT Adapter unpacks it and recreates the DP stream. Other protocols, such as USB and PCIe may also be tunneled. A host device on the bus manages the tunneling to ensure quality of service (QoS) guarantees are met. Consequently, adding more devices and/or guaranteeing bandwidth or latency (such as for a display) creates a burden on the host as it must manage and rearrange packet delivery on the bus in its attempt to keep QoS guarantees. And when a combination of devices is unworkable due to the devices requiring more resources than a host can manage, e.g. due to excessive processor load required to manage all devices and/or exceeding available bus bandwidth, errors may occur and/or an operating system (OS) of the host may fail to enumerate a device.

Figure 1:
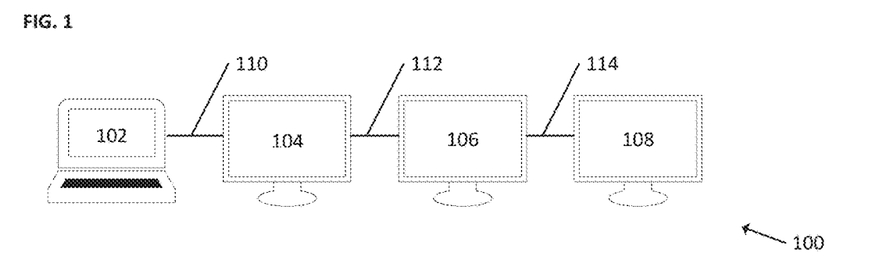
FIG. 1 illustrates a system according to an exemplary implementation of devices arranged in a daisy-chain topology.

FIG. 1 illustrates a system 100 according to an exemplary implementation of devices arranged in a daisy-chain topology. Illustrated are a computer 102, e.g., a laptop or computer or other computing device, and a daisy-chain of three displays 104-108, e.g., DisplayPort (DP) or other display technology. It will be appreciated that USB supports DP monitors but the present disclosure is broader than the particular limitations inherent to using the USB4/Thunderbolt 4 (USB) Standards and that the principles taught herein are application in other environments with other devices such that they may operate in accord with the teachings herein. The computer may be connected to the first display 102 by way of a USB cable 110, e.g., a Type-C cable per the current USB Specification. The monitors may in similar fashion chain themselves with USB Type-C cables 112, 114.

As will be appreciated by one skilled in the art, the USB-IF established a logically layered environment in which stacked layers include a USB power delivery layer, on top of which may be a connector layer (here Type-C), on top of which may be a USB, e.g., USB4, transport layer, and above may be a layer including USB3, PCIe, DP, and any other protocols now or in future that may be carried over the USB. This is the layered structure upon which the USB specification rests (e.g., this may be a USB4 layer with a Thunderbolt 4 layer on top). USB link bandwidth is managed by a Connection Manager (CM). The CM runs on the host router (or host controller, which may be the computer 102) and is responsible for, among other things, establishing tunnels. Under, for example, USB4, the CM reserves 10% of USB bandwidth as guard bandwidth for USB link overhead and not non-isochronous tunneled protocol paths. See the USB4 Standard for a detailed explanation of a USB4 system. The remaining 90% of the bandwidth may be allocated entirely or partially to isochronous tunneled protocols by the Connection Manager. Isochronous data transfers typically includes time sensitive data or information, such as video or audio data, and the USB Standard guarantees a minimum bandwidth and latency for isochronous transfers.

With 10% bandwidth reservation, as discussed above, the remaining 90% provides approximately 17 Gbps on a 20 Gbps link, such as on a 2-lane Thunderbolt link, or approximately 36 Gbps on 40 Gbps link, such as on a 4-lane Thunderbolt link. Another consideration when exploring bandwidth constraints is legacy display connectors, such as HDMI or DisplayPort, have dedicated bandwidth and IO that must remain available to provide a user an expected performance experience. Display Input/Output (IO) is directly proportional to display resolution, hence bus bandwidth constraints are more pronounced when display resolutions increase, e.g., there are many user-level 5K and higher resolution displays available today that further limit options on even a 40 Gbps bus. In the illustrated embodiment, if we assume the displays 104-108 are operating at a common 4K resolution, and connected to the bus in Single-Stream Transport (SST) mode, each display requires approximately 16 GPs of bus bandwidth. This means even if using a 4-lane 40 Gbps bus, notwithstanding USB tunneling theoretically allowing for at least three daisy-chained displays, the bus cannot actually accommodate the bandwidth required for the three displays. It will be appreciated as standards evolve, and features of devices change (e.g., a 4K display is common today but 8K may be common soon), the speeds, available bandwidth, system overhead, etc. will change and hence the specific examples presented herein are exemplary only and the principles are to be applied to future technology as the technology and ecosystems evolve.

In addition to bandwidth, another practical limitation should be considered. Each additional device represents additional computational loads for a host, e.g., the computer 102. In order for the host to manage the tunneling for a device, as well as accommodate additional bandwidth for the device. However, knowledge of tunneled display bandwidth requirements and their performance bottle necks are contained within the Connection Manager/Display drivers, and are not visible to, for example, host operating system (OS) governors, which may result in ineffectively managing a platform's capabilities and power conservation. When adding a device, such as an additional display set to a 4K display mode, an error may arise due to overloading the host, e.g., its CPU configuration cannot support managing tunneling for an additional device. Alternatively or in addition to this issue, as discussed above, there may be a bus bandwidth limitation that will not accommodate the additional device. One result of this is the host will not allow an additional device to be enumerated on the bus. When a user is aware that USB should allow for multiple devices, such as three displays 104-108, but one will not enumerate due to load, bandwidth or other issues, this represents a poor user experience.

In various embodiments, to address such problems, contextual knowledge for a tunneled protocol may be used to alleviate such problems by attempting to influence bus devices to enter operating modes allowing the devices to all be enumerated. For example, if the host determines the use of one of the displays may perform well if the display were in a 2K instead of 4K mode, and if in a 2K mode then the bus and/or host could accommodate adding a third display, then the host may (as will be discussed in more detail below) request the display to enter a 2K mode. If this is successful the host may then enumerate the new display and avoid the errors discussed above.

Figure 2:
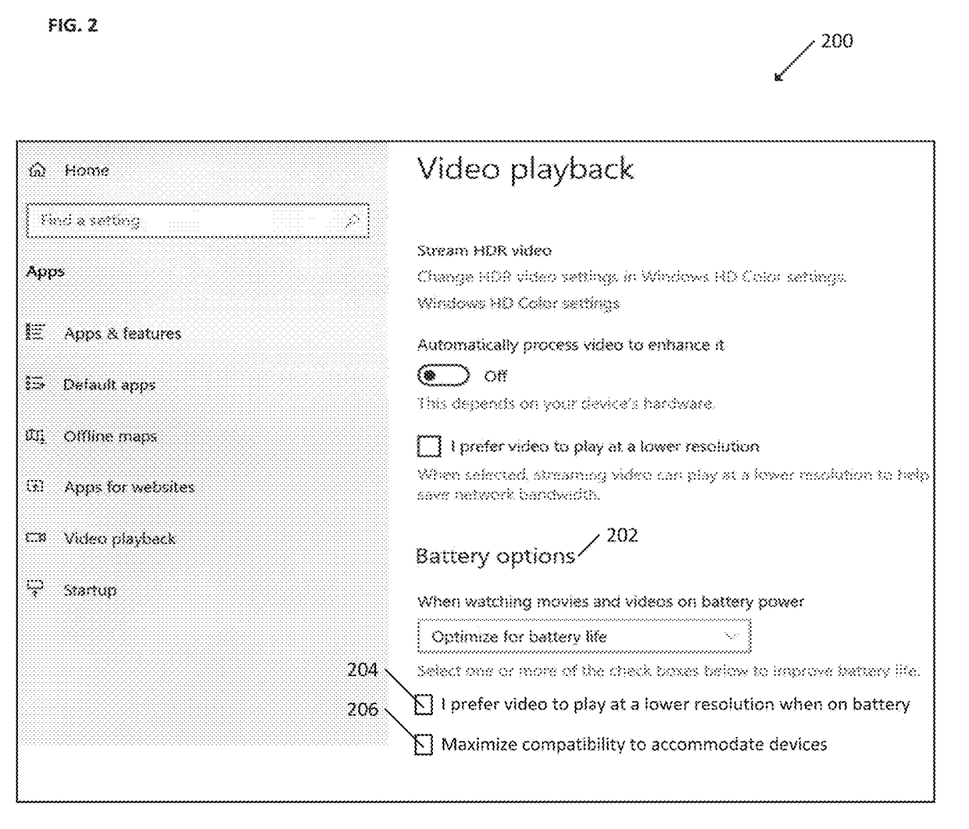
FIG. 2 illustrates according to an exemplary implementation an exemplary operating system power management settings panel.

FIG. 2 Illustrates according to an exemplary implementation an exemplary Microsoft Windows Operating System Power Management (OSPM) settings panel 200. It will be appreciated Windows is presented as one of many possible OS environments providing for settings, such as Apple OS X's preference panel, that allow indicating preferences to optimize, minimize, or otherwise suggest a desire that the OS adjust operational characteristics of a device. In the illustrated exemplary implementation, the settings panel includes a "Battery Options" section 202 that allows a user (or an administrator if device management is involved) to affect what may happen when "watching movies and videos on battery power." A check box 204 may track a preference for "video to play at a lower resolution when on battery."

This setting may be used as a context clue for whether a Connection Manager (CM), USB router, and/or other software and/or hardware manager should attempt to influence a device to switch to a different operational state. In addition to or alternatively, new settings panel (or preferences panel) options may be added to specifically address influencing. That is, for example, a check box 206 may be added to the settings panel 200 to track a preference for "Maximize compatibility" to allow, for example, indicating a desire to automatically attempt to dynamically adjust device operation to accommodate enumerating an additional device rather than fail enumeration because current device settings will not allow it. The example above regarding a display operating at 4K when it does not need to be at 4K, with this setting, the user may indicate a preference to readjust display resolution if that would enable enumerating, for example, the third FIG. 1 display 108 when enumeration would otherwise fail. It will be appreciated this option may be used when a user (or device management) elects to optimize and/or minimize power usage, device wear and tear, CPU loads (of a host and/or device), etc.

Current USB Standards providing for data communication between bus devices, power delivery (PD) over the bus, and protocol tunneling through the bus as well as through intermediary devices on the bus. For example, logically a host, e.g., FIG. 1 host computer/laptop 102, sees a direct link ("virtual wire") to devices, e.g., the third FIG. 1 display 108, notwithstanding the host-device connection traveling through two intermediary display devices 104, 106. With the host providing OS options/preferences, such as check boxes 204, 206, it enables the OS to influence device setting changes with explicit user consent. In particular, when a new device is added to the bus and enumeration proceeds, e.g., link initialization, sending a Hot Plug event to the CM, etc., if the new device cannot be accommodated, rather than returning an error (e.g., to one or more of the OS, user, devices on the bus, etc.), instead the OS may inspect dynamic influencing preferences such as check boxes 204, 206. It will be appreciated influencing preferences may be associated with specific devices and/or globally set for a class of devices, e.g., a user (or management environment) may elect that all display devices, such as FIG. 1 displays 104-108 be automatically influenced as needed to try to move to one or more display to a different configuration that would enable successful attachment of a new device to the bus.

It will be appreciated the terms influence and influencing are used to represent while a request may be made, e.g., from a host to bus device, it is not guaranteed a particular device (or set of devices) may move to a compatible configuration. However, enumeration of a new device does not have to fail until all possible influencing requests have been tried. It will be appreciated influencing may result in a host-to-device and/or device-to-device dialog where the host may request, for example, a display device to drop from a current 5K resolution to 2K, and the display may respond this request cannot be done right now (perhaps due to what is being displayed and/or how the display is presently being used), but the display may respond that it could drop from 5K to 4K. Knowing this, the host may turn to other devices to see if they can adjust settings so collectively the devices may adjust their operational mode, settings, etc. to accommodate the new device. That is, even though the 5K to 4K drop in resolution might not be sufficient to accommodate the new device, that change in addition other adjustment(s) made by other devices on the bus may cumulatively allow successful enumeration.

Note also, that while devices may be able to self-determine ability to adjust their operating parameters, e.g., to drop resolution, it will be appreciated it may require awareness of what use is being made of the device. For example, let's assume the FIG. 1 display 104 is presenting output from a resource-intensive video conferencing application operating at 720 p "HD" resolution (e.g., 1280×720 representing 720 horizontal lines in the video data). Note the display may or may not be operating at 4K, e.g., 3840×2160 (a common 4K resolution), even though the video conferencing application may be using a lower resolution. For example, the conferencing application may be windowed in a subsection of the display. Or, the display may have set its resolution to 720 p, in response to an option, see, e.g., the check box 204 discussion.

In FIG. 1 assume each of the displays 104-108 are 4K resolution displays. As discussed above, even with a 4-lane 40 Gbps USB configuration, we cannot enumerate a third display at 4K. Above we assumed the FIG. 1 display 104 is presenting a 720 video conference. Let's also assume the second display 106 is displaying a word processing application. It will be appreciated 4K may be higher a resolution than is required for the word processing application. It will be appreciated displays operating at 4K represents an additional CPU load on the host, in addition to bandwidth requirements that might not be met, e.g., the USB can only support the first two displays 104, 106. Therefore, in one embodiment, device mode/configuration/feature settings are dynamically influenced to change modes to reduce the load on the device driving the display, e.g., the host device or other device (e.g., an external GPU apparatus), as well as to resolve other issues such as enabling enumeration as discussed above. For example, with the assumption that the first display 104 is presenting a 720 p video conference, running the display at 4K is an unnecessary burden on the host, e.g., computer 102.

Therefore when the video conferencing application on the first display 104 is run at 720 p, the operating system may influence the display to switch to a lower resolution, e.g., to a 720 p HD mode. In one embodiment, influencing may be through a Connection Manager (CM) running on the host and communicating with the display over the bus (recall the USB is a converged-IO bus supporting simultaneous data, video, etc.). The host may request the first display to switch (scale) its output to 720 p.

Figure 3:
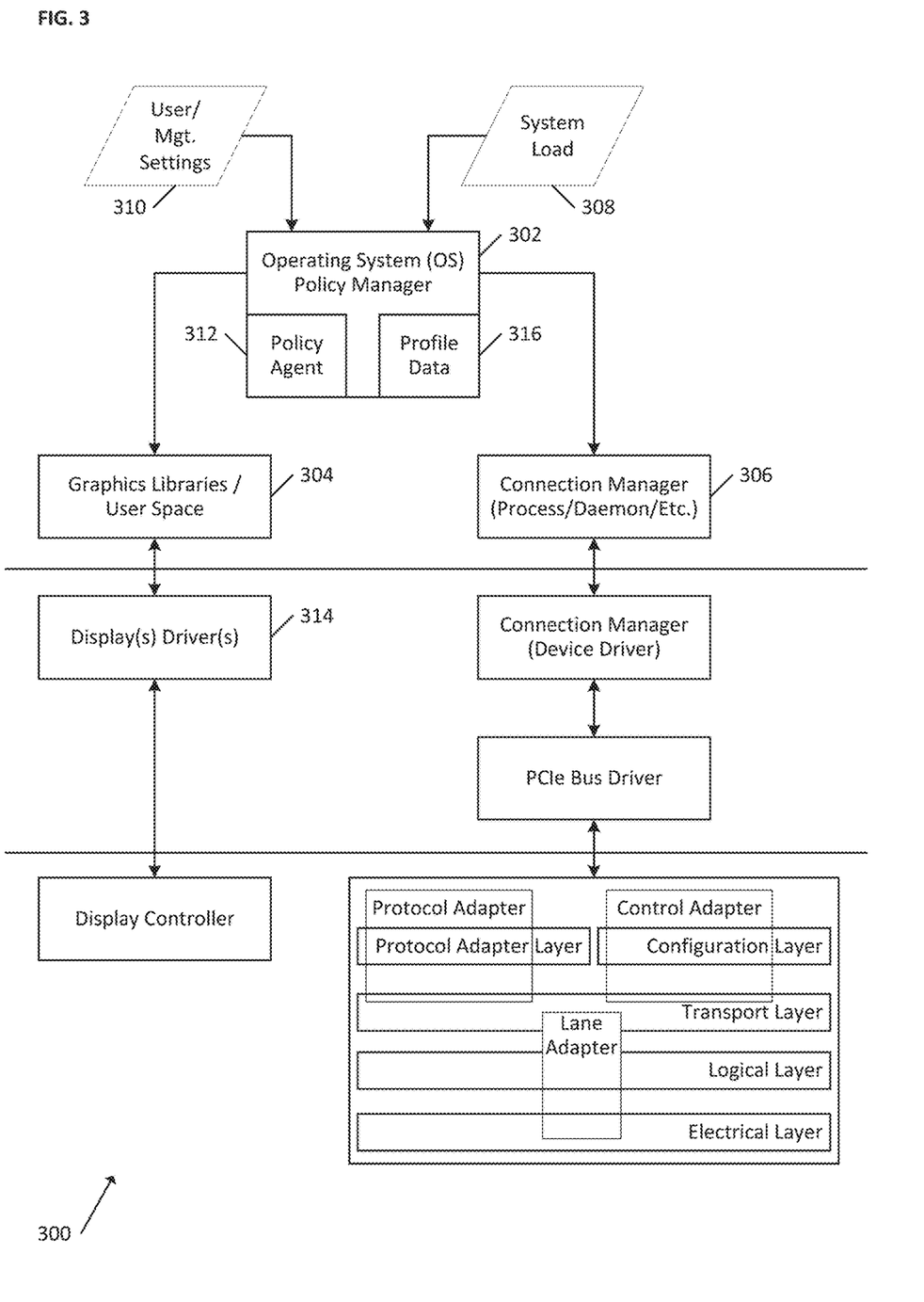
FIG. 3 illustrates according to an exemplary implementation a flow diagram to influence a device's operation.

FIG. 3 illustrates according to an exemplary implementation a flow diagram 300 including an operating system (OS) policy manager 302 that may communicate with a graphics library 304 and a Connection Manager (CM) 306 to influence a device's operation, e.g., to influence its device mode/configuration/feature/settings/etc. As discussed above, the host may request a display to change its operating mode to 720 p to, for example, reduce load 308 on the host, and/or to meet a user setting 310 (see, e.g., FIG. 2 check boxes 204, 206) and/or to enable enumeration of a third display when bandwidth constraints otherwise would not allow it and/or for some other need or purpose.

One reason why a conventional host OS/USB router is not influencing device settings is because the host graphics libraries 302 and the CM operate within the host as separate entities (e.g., depending on the OS they may be referred to as separate modules, daemons, processes, etc.). There is no policy management and/or dynamic communication between them 304, 306 to enable dynamic influencing of device modes. This results in lack of knowledge of what is tunneled over the USB, e.g., tunneled display bandwidth requirements, and performance bottlenecks obscured within CM/display drivers not visible to host OS governors, etc. The OS policy manager 302, by bridging and/or sharing information, such as state, status, load, application type, application requirements, device requirements, etc. between graphics libraries 304 and the CM 306, may lead to effective management of a platform's ability to readjust device settings for better performance and power conservation.

In one embodiment, a tunneled display will be influenced, as needed, based at least in part on communication with the graphics library 304 the CM 306 such that the display mode or other operation settings are adjusted with respect to, for example, the tunnel needs (a USB tunnel may have associated Quality of Service (QoS) or other data rate/latency guarantees and/or requirements) and CPU needs and/or limits (based at least in part on system load 308) so as to effectively use system resources. In one embodiment, the system load 308 may generically track the current system load in general, and point to the host being busy for some reason, where the load represents a general context in which influences may be presented to a device to seek a mode change(s) to reduce the system load. In another embodiment the system load may identify specific software and/or hardware associated with at least a portion of the system load to facilitate a targeted load reduction.

To facilitate influencing devices as discussed above, in one embodiment, a host system registers hooks to the USB Connection and Display drivers to listen for USB messages and/or system events such as a Hot Plug Detect (HPD) or Hot Plug Event control packet that indicates a new device has been introduced, e.g., attached, to the USB. In one embodiment, the OS policy manager 302 of the host has a policy agent 312 that registers the hooks. It will be appreciated hooks are just one of many ways available to adjust the behavior and/or operation of an application, driver, operating system, application, and/or other software and/or hardware components. Registering a hook allows, in this example, the policy manager 302 and/or the policy agent 312 to be notified for activity of interest, such as the HPD, and inspect and/or intercept data transfers, function calls, messaging (by software or hardware), events (e.g., the HPD on the USB bus), etc. and take action. It will be appreciated using hooks is for expository convenience and that any registration/callback or other software and/or hardware system may be used so long as policy manager 302, policy agent 312 or other hardware and/or software construct is able to snoop and/or otherwise access messages and/or event data.

For example, the policy agent 312 may listen for a HPD, and evaluate the device associated with the HPD event to determine what action or influence, if any, needs to be taken with respect to the device. Assume evaluation results in a determination the new device is a display and we desire to lower its resolution in accord with a user setting 310 indicating interest in optimizing performance (see, e.g., FIG. 2 check box 204, 206 discussion) because adding the new device may create unnecessary host load 308, and/or exceed bus bandwidth, and/or fail for some other reason. In one embodiment, the policy agent 312 influences the Connection Manager 306 and/or the display driver 314 (by way of communication with the graphics library 304) to dynamically change the attaching device's operating mode to dynamically change the bandwidth requirement of the display pipe (the tunneled display data) to accommodate the user preference 310 and system need, e.g., based at least in part on system load 308 and/or some other characteristic of the system.

In one embodiment, the policy manager 302 has a data store 316 that may store, for example, profile policies that may be preconfigured (for convenience) for various device types and/or connection environments, so that an HPD or other event of interest may be determined to correlate with a preconfigured profile and be used as a basis for influences that may be made of the new device and/or other devices on the USB. In one embodiment, which may be this or another embodiment, the policy manager may determine influences based at least in part on CPU telemetry, such as would be reflected in the system load 308. It will be appreciated that the system load is used for exemplary purposes and one skilled in the art will appreciate a multi-CPU or multi-core environment corresponding to one or more CPU may have associated load and operational data regarding one or more CPU and/or cores thereof, and that this data regarding CPU activity/state may be accessed and used to determine applicable influences. The system load may incorporate such CPU activity/state data or be separate accessible data.

In one embodiment, rather than directly influence a device (or in addition to influencing a device) the policy manager 302 may recommend a USB-C alternate mode lane management (to support third party protocols such as influencing device operation). For example, as discussed above, a display may connect and seek to use a tunnel over a 4-lane USB link, such as to support enumeration as a 4K device. Instead the policy manager may recommend it establish a 2-lane alternate mode connection, which would result in the display configuring itself at a lower resolution if and as necessary. Alternatively, the policy manager may force the appearance of, for example, a 2-lane link regardless of the USB supporting 4 (or more) lanes. It will be appreciated the use context of the device may be used in consideration of what influence to recommend to devices on the bus. For example, the previously discussed video conferencing or word processing may lend themselves to recommendations for lowering resolution, changing refresh rates (e.g., some applications, such as a slide deck presentation may not need a 60 Hz refresh rate), lowering execution priority of an application, etc.

In one embodiment, the policy manager may include an AI (Artificial Intelligence) 318, machine learning, or other reasoning system to assist with influence recommendations, e.g., recommendations may be presented to software/hardware of a host, to user of a host or other device, etc.), and/or to dynamically/automatically perform device influencing, such as in response to the HPD or other event of interest. The AI may be communicatively coupled with a variety of information sources, e.g., user settings 310, system load 308, database of profile data 316, communication to/from graphics libraries 304, Connection Manager 306, display driver 314, etc. These sources are exemplary, and it will be appreciated the AI may receive and analyze data from arbitrary sources that may be associated with a device ecosystem. The AI may be a combination of one or more machine learning systems, e.g., a neural network, deep neural network, convolutional neural network, "deep learning" or other type of reasoning system that may be used to provide input to one or more participants in a conference. Exemplary deep learning AIs include Convolutional Neural Network (CNN), K-nearest neighbor (KNN), Artificial Neural Network (ANN), Recurrent Neural Network (RNN), Deep Neural Network (DNN), Deep Belief Networks (DBN), as well as many others. It will be understood the AI may learn and/or train from supervised and unsupervised learning approaches. For example, the AI may monitor the effect of dynamically trying various influences, including applying one or more preconfigured profiles, and track which result in successful device enumeration. Assuming the AI is provided access to host and/or bus data and/or information sources, and has been trained if necessary, e.g., some AIs such as deep learning AIs are self-organizing, the AI will continue to train/learn as it monitors device influencing and accesses enumeration success.

In one embodiment, an OS policy manager 302 may, in response to a HPD or other event of interest, extend a Connection Manager 306 and influence a display subsystem to set appropriate display parameters such as video resolution and/or bitrate to accommodate system concerns such as reducing system load 308, reducing bandwidth requirements, or to satisfy some other explicit (by user preference/settings 310) or implicit system need. As a result, the system load for an exemplary display use case is reduced, giving better performance (and hence better user experience), as well as a reduction of burden on the USB management since influencing a lower resolution, for example, reduces host data tunneling and QoS burden.

In one embodiment, the OS policy manager 302 may be implemented as a user space daemon/process/resident application or the like and/or it may be a system process and/or some combination of the two, e.g., a system process accessible to users of a machine that operates in conjunction with a user space daemon configured with specific preferences. It will be appreciated the system process may have default and/or required settings that may (or may not depending on device management concerns) be overridden by user preferences. The policy manager may, based at least in part on system and/or user preferences, and/or system load 308 such as discussed above, determine desirable display bandwidth requirements. As discussed, the determining what is desirable may be based on AI and/or preconfigured profile data to determine if video resolution or video bitrate could be reduced to accommodate, for example, adding a third display (see, e.g., FIG. 1 display 108), to reduce system workload, to achieve some other system goal, and/or satisfy a host, router, or other device policy. Thus, the OS policy manager may, for example, communicate a bandwidth need to the USB display drivers 314 so they can reduce the display bandwidth as needed Recall, for example, the FIG. 1 discussion regarding running a video conferencing application on the first display 104. The OS policy manager 302 may determine (e.g., with the AI, by applying the preconfigured profile data 316, or by some combination of these or by other decision making process) that it wants to reduce the video resolution to 720 p as per the current use case and system load. The policy manager may then influence the USB Connection Manager (CM) 306 and display driver 314. That is, the policy manager may communicate the desire for a 720 p resolution to the CM which may in turn reduce the bandwidth allocated to the display. The policy manager may also communicate the same to the display subsystem either directly or indirectly through the CM so that the display subsystem may reduce the video resolution to 720 p. Similarly, other characteristics of a device may be influenced into another mode and/or operational setting. For example, video bitrate may also be reduced if needed to reduce the display bandwidth further, such as to accommodate enumerating a device. It will be appreciated since display bandwidth is proportional to CPU bandwidth consumption, it impacts system load 308, and reducing display bandwidth results in better performance.

Figure 4:
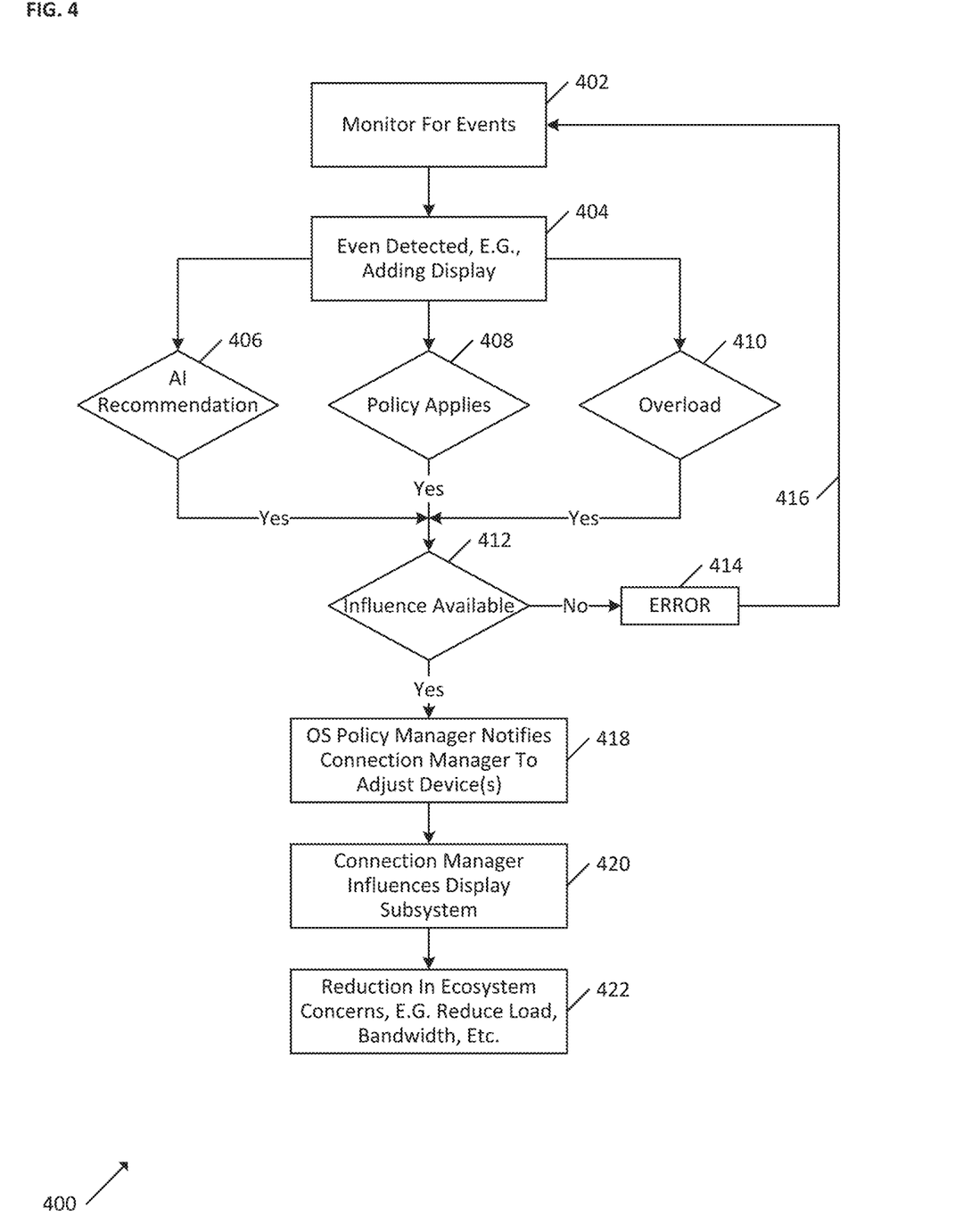
FIG. 4 Illustrates according to an exemplary implementation a flow diagram of an OS policy manager influencing display bandwidth.

FIG. 4 Illustrates according to an exemplary implementation a flow diagram 400 of an OS policy manager influencing display bandwidth in accord with the FIG. 3 exemplary implementation. A first operation may be the OS policy manager monitoring 402 for events of interest, such as monitoring system load, user preferences, or other concerns/interests. It will be appreciated by one skilled in the art the load or preferences are exemplary and that any characteristic, feature, configuration, etc. of a host and/or other device attached to a bus, such as the USB, may be monitored. If an event of interest is detected, such as receiving 404 a device connection event, e.g., attaching a display to the USB, then the policy manager may perform multiple tests to see if 406-410 various conditions are true.

A first test responsive to receiving 404 the connection event may be to test if 406 an AI or other automated decision process has an influencing recommendation for potentially requesting a change to the configuration of the newly attached device and/or to modify the operating characteristics of one or more existing device on the USB. Or, a test may be performed to determine if 408 there is a user and/or system (e.g., for a managed device) policy related to connecting the device to the bus, such as an OS setting to reduce display quality under various circumstances such as discussed above. Or, a test may be performed to determine if 410 the host system load is deemed currently excessive and/or over a threshold where enumerating the device would likely result in an overload for the host. It will be appreciated while the tests are shown operating in parallel, they may be performed asynchronously as illustrated or in order, and the various operations and/or producing errors would be modified accordingly.

In addition, to keep the figure from being overly complex, all possible logical interactions are not illustrated. For example, if 410 the system is deemed to overload if enumerating the device, unless the other tests would result in a configuration of one or more attached device that would resolve the overload, the overload test is dispositive and requires an error. Similarly, the tests could be ranked such that if there is a system/user policy that is tried first, and if no system/user policy then the AI consulted for a recommendation, and in either case the influence tested for risk of an overload. However, for presentation clarity, the various ways in which these exemplary tests, or other tests not illustrated, may be arranged are simplified with the illustrated further test to determine if 412 the OS policy manager has an available influence to try that will satisfy user/system policy (if any), not trigger an overload of the host and/or the bus, and satisfy one or more influence events (if any) proposed by the AI.

If 412 none of the bus devices (e.g., the newly attached or existing devices) may be influenced so that the newly attached device may be accommodated, then an error may be handled 414, such as by displaying an error message, setting an error flag, throwing an exception, returning an error value (e.g., as a process/application program result), etc. After handling the error, processing may continue 416 with monitoring 402 for an even of interest. If 412 an influence is available to accommodate the monitored event then in one embodiment, the OS policy manager may notify 418 the USB Connection Manager (CM) to adjust an affected device and/or the bus accordingly. Assume the monitored 402 event was attaching a display to the USB. If 412 there is an applicable policy relating to ability to reduce the resolution of the display from a default, such as 4K or 8K, to a lesser resolution to accommodate its addition to the bus, in one embodiment, to do so, when detecting attaching a Display-Port (DP) device, the OS policy manager would have the CM allocate a lower bandwidth to the DP.

A display subsystem may then be influenced 420 by the OS policy manager and/or the CM to reduce display bandwidth by setting a lower resolution and/or establishing a lower bitrate. It will be appreciated one of both action may be taken depending on whether the influence(s) needed are resolution, bitrate or other concern needing to be addressed. When performed, there may be a reduction 422 in individual device and ecosystem concerns, e.g., reducing system load and/or reducing bus I/O bandwidth consumption and/or power consumption, improving other device concerns addressed by an influence, and through these changes to the ecosystem, ultimately providing a better user experience. For clarity in presentation, various error states that may arise from the illustrated operations 418-422 are not presented but if an error occurs processing may continue with handling 414 the error.

Figure 5:
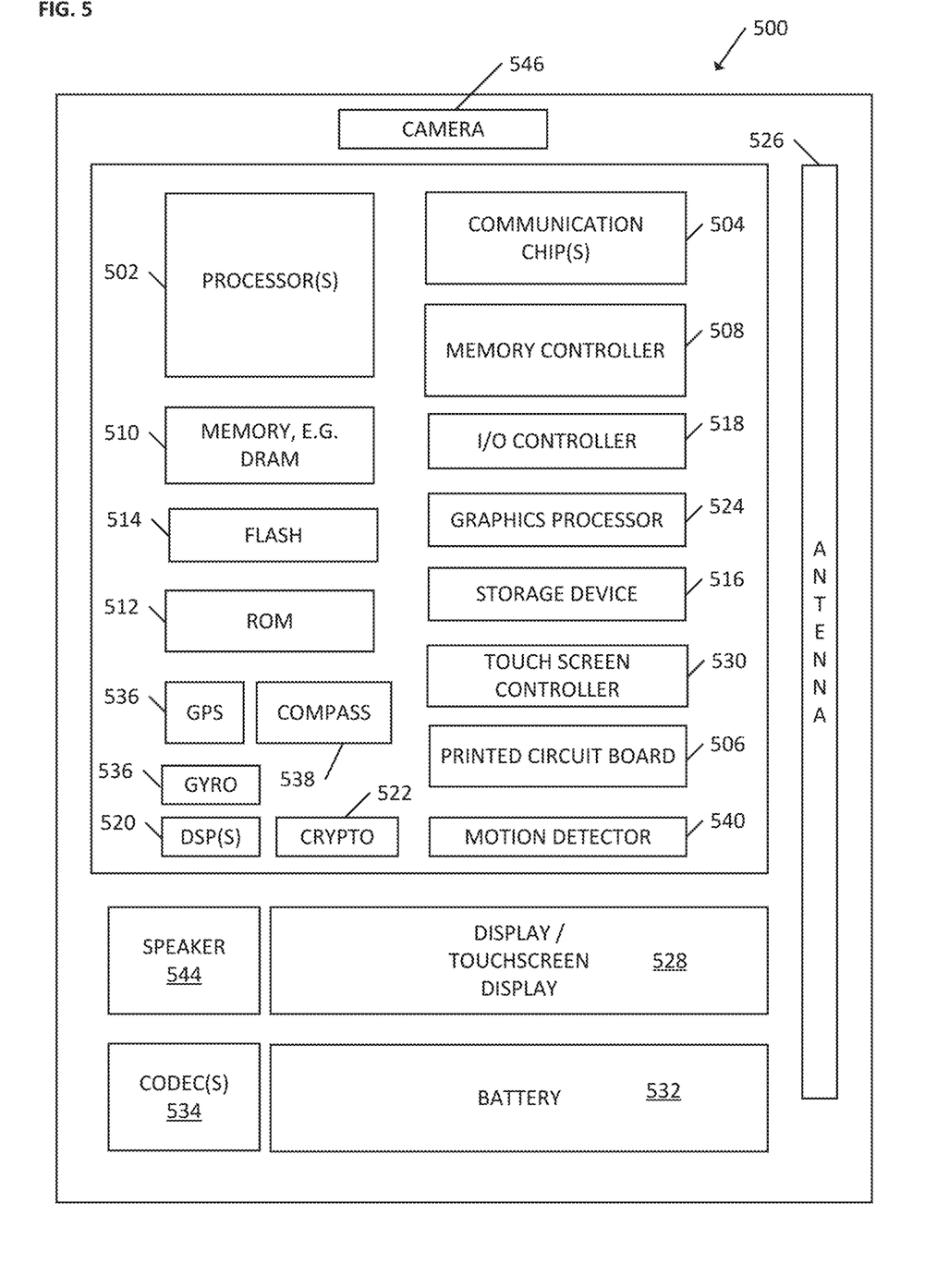
FIG. 5 illustrates an exemplary computer device in accordance with various embodiments.

FIG. 5 illustrates an exemplary computer device 500, in accordance with various embodiments, that may employ the apparatuses and/or methods described herein for FIGS. 2-4. As shown, computer device 500 may include a number of components, such as one or more processor(s) 502 (one shown) and at least one communication chip(s) 504. In various embodiments, the one or more processor(s) each may include one or more processor cores. In various embodiments, the at least one communication chip may be physically and electrically coupled to the one or more processor(s). In further implementations, the communication chip(s) may be part of the one or more processor(s). In various embodiments, computer device 500 may include printed circuit board (PCB) 506. For these embodiments, the one or more processor(s) and communication chip(s) may be disposed thereon. In alternate embodiments, the various components may be coupled without the employment of PCB 506.

Depending on its applications, computer device 500 may include other components that may or may not be physically and electrically coupled to the PCB 506. These other components include, but are not limited to, memory controller 508, volatile memory (e.g., dynamic random access memory (DRAM) 510), non-volatile memory such as read only memory (ROM) 512, flash memory 514, storage device 516 (e.g., a hard-disk drive (HDD)), an I/O controller 518, a digital signal processor 520, a crypto processor 522, a graphics processor 524 (e.g., a graphics processing unit (GPU) or other circuitry for performing graphics), one or more antenna 526, a display which may be or work in conjunction with a touch screen display 528, a touch screen controller 530, a battery 532, one or more codec(s) 534, e.g., an audio codec, a video codec, a bus management codec, OS policy manager codec, etc., a positioning system such as a global positioning system (GPS) device 536 (it will be appreciated other location technology may be used, including location services provided by software operating within computer device 500 and/or in combination with location estimation services), a compass 538, a motion/movement detector 540, e.g., an accelerometer and/or other devices to detect motion in one or more axes, real and/or relative movement through space, etc., a gyroscope 542, a speaker 544, a camera 546, and other mass storage devices (such as hard disk drive, a solid state drive, compact disk (CD), digital versatile disk (DVD)) (not shown), and so forth.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

In some embodiments, the one or more processor(s) 502, flash memory 514, and/or storage device 516 may include associated firmware (not shown) storing programming instructions configured to enable computer device 500, in response to execution of the programming instructions by one or more processor(s), to practice all or selected aspects of the methods described herein. In various embodiments, these aspects may additionally be or alternatively be implemented using hardware separate from the one or more processor(s), flash memory, or storage device(s). In one embodiment, memory, such as flash memory or other memory in the computer device, is or may include a memory device that is a block or byte addressable memory device, such as those based on NAND, NOR, Phase Change Memory (PCM), nanowire memory, and other technologies including future generation nonvolatile devices, or a combination of any of the above, or other memory. The memory device may refer to the die itself and/or to a packaged memory product.

In various embodiments, one or more components of the computer device 500 may implement an embodiment of the FIG. 1 devices 102-108, etc. Thus for example the one or more processor(s) 502 could be the processor of a host device on the Universal Serial Bus, such as FIG. 1 computer 102 communicating with memory 510 though memory controller 508. In some embodiments, I/O controller 518 may interface with one or more external devices to receive a data, such as over a wired and/or wireless bus, including the Universal Serial Bus. Additionally, or alternatively, the external devices may be used to receive a data signal transmitted between components of the computer device 500.

The communication chip(s) 504 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device may include a plurality of communication chips 504. For instance, a first communication chip(s) may be dedicated to shorter range wireless communications such as Wi-Fi and Bluetooth, or other standard or proprietary shorter range communication technology, and a second communication chip 504 may be dedicated to longer range wireless communications such as GPS, EDGE, GPRS, CDMA, WiMAX, LTE, Ev-DO, and others.

The communication chip(s) may implement any number of standards, protocols, and/or technologies datacenters typically use, such as networking technology providing high-speed low latency communication. For example the communication chip(s) may support RoCE (Remote Direct Memory Access (RDMA) over Converged Ethernet), which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANs), parallel computing using RDMA, Internet Wide Area Remote Protocol (iWARP), InfiniBand Architecture (IBA), and other such technology. Computer device 500 may support any of the infrastructures, protocols and technology identified here, and since new high-speed technology is always being implemented, it will be appreciated by one skilled in the art that the computer device is expected to support equivalents currently known or technology implemented in future.

In various implementations, the computer device 500 may be any device implementing the above-described influencing of bus device operation modes, such as a device implementing the FIGS. 3-4 OS policy manager, such as a laptop, a netbook, a notebook, an ultrabook, a smartphone, a computer tablet, a personal digital assistant (PDA), an ultramobile PC, a mobile phone, a desktop computer, a server, a printer, a scanner, a monitor, a set-top box, an entertainment control unit (e.g., a gaming console, automotive entertainment unit, etc.), a digital camera, an appliance, a portable music player, or a digital video recorder, or a transportation device (e.g., any motorized or manual device such as a bicycle, motorcycle, automobile, taxi, train, plane, drone, rocket, etc.). It will be appreciated computer device 500 is intended to be any electronic device that processes data.

Figure 6:
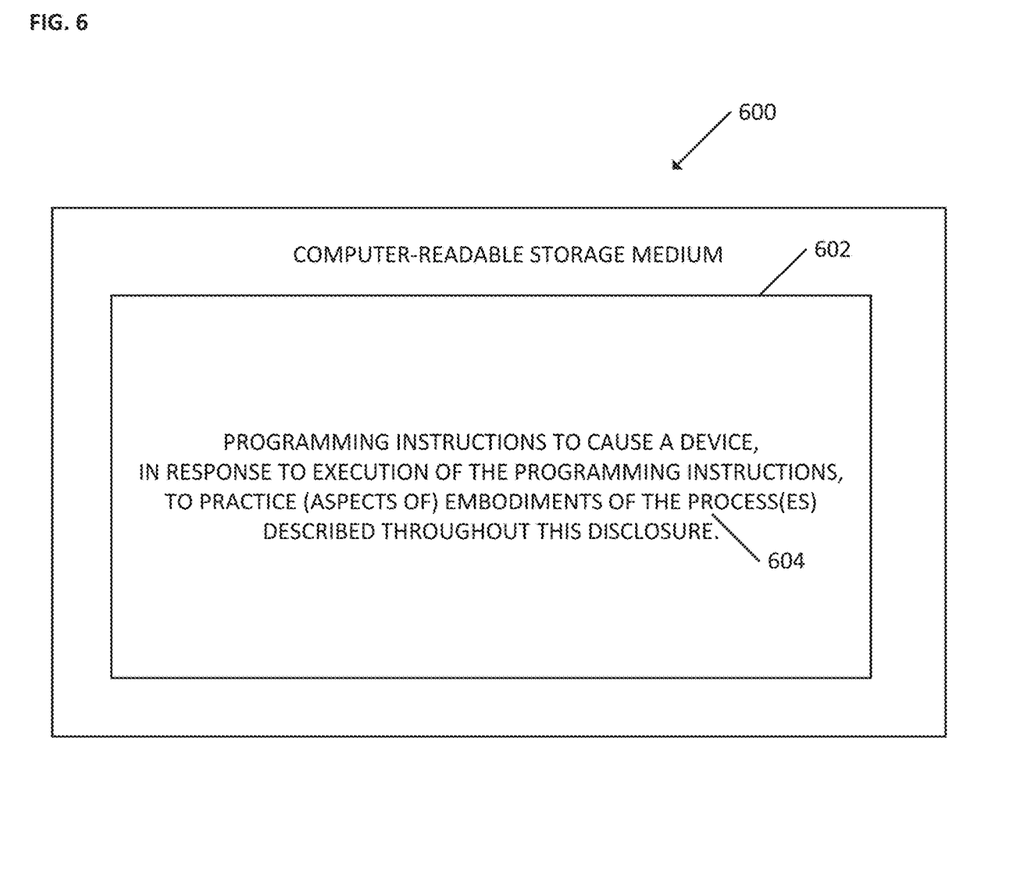
FIG. 6 illustrates an exemplary computer-readable storage medium.

FIG. 6 illustrates an exemplary computer-readable storage medium 600. The storage medium may be transitory, non-transitory or a combination of transitory and non-transitory media, and the medium may be suitable for use to store instructions that cause an apparatus, machine or other device, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 602 may include a number of programming instructions 604. Programming instructions 604 may be configured to enable a device, e.g., computer device 500, in response to execution of the programming instructions, to implement (aspects of), for example, the FIG. 3 OS policy manager 302, graphics libraries 304/user space code, or connection manager 306. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct and/or coordinate operation of one or more computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may be one or more non-transitory computer readable media (CRM) comprising instructions for a policy manager to influence a mode of one or more device on a managed converged-IO Universal Serial Bus (USB) to accommodate attaching a new device to the USB, the instructions, when executed, provide for: monitor for an event corresponding to attaching the new device; determine based at least in part on the event available influences for the mode of the one or more device; select a first influence of the available influences; identify a first target device to receive the first influence; evaluate whether applying the first influence to the target device accommodates attaching the new device to the USB; and apply the first influence to the target device.

Example 2 may be Example 1, the instructions including further instructions to provide for: determine, for the one or more device on the managed USB, an ecosystem identifying at least one or more operational characteristic of the one or more device; and perform the evaluate based at least in part on the ecosystem.

Example 3 may be any of Examples 1-2, the instructions including further instructions to provide for: determine, based at least in part on the evaluate, a failure to accommodate attaching the new device; select, responsive to at least the failure, a second influence of the available influences; identify a second target device to receive the second influence; and evaluate whether respectively applying the first and second influences to the first and second targets accommodates attaching the new device to the USB.

Example 4 may be Example 3, the instructions including further instructions to provide for: select different influences for the first and second targets.

Example 5 may be any of Examples 1-4, the instructions including further instructions to provide for: influence a selected one or more of a USB connection manager or a display driver to make a change to a USB connection for the new device to minimize a bandwidth requirement of the new device.

Example 6 may be any of Examples 1-5, the instructions including further instructions to provide for: determine the new device is a display; determine a bandwidth reduction for the display accommodates attaching the display to the USB; influence a USB connection manager to make a change to the mode of the display; and notify, by the USB connection manager, a display driver to reduce a resolution of the display.

Example 7 may be any of Examples 1-6, the instructions including further instructions to provide for: select the new device to be the target device.

Example 8 may be any of Examples 1-7, the instructions including further instructions to provide for: determine the available influences based at least in part on at least one recommendation provided by an Artificial Intelligence monitoring the one or more device on the managed USB.

Example 9 may be any of Examples 1-8, the instructions including further instructions to provide for: determine the attaching the first device may result in an overload; and select the first influence to address the overload, Example 10 may be any of Examples 1-9, the instructions including further instructions to provide for: provide profiles for the new device based at least on adjusting a CPU characteristic; and select the first influence based at least in part on a user preference or a system load.

Example 11 may a system comprising at least one processor, a memory for storing at least instructions for a policy manager to influence a mode of one or more device on a managed converged-IO Universal Serial Bus (USB) to accommodate attaching a new device to the USB, the instructions, when executed, provide for: monitor for an event corresponding to attaching the new device; determine based at least in part on the event available influences for the mode of the one or more device; select a first influence of the available influences; identify a first target device to receive the first influence; evaluate whether applying the first influence to the target device accommodates attaching the new device to the USB; and apply the first influence to the target device.

Example 12 may be Example 11, the instructions including further instructions to provide for: determine, for the one or more device on the managed USB, an ecosystem identifying at least one or more operational characteristic of the one or more device; and perform the evaluate based at least in part on the ecosystem;

Example 13 may be any of Examples 11-12, the instructions including further instructions to provide for: determine, based at least in part on the evaluate, a failure to accommodate attaching the new device; select, responsive to at least the failure, a second influence of the available influences; identify a second target device to receive the second influence; and evaluate whether respectively applying the first and second influences to the first and second targets accommodates attaching the new device to the USB.

Example 14 may be Examples 13, the instructions including further instructions to provide for: select different influences for the first and second targets.

Example 15 may be any of Examples 11-14, the instructions including further instructions to provide for: influence a selected one or more of a USB connection manager or a display driver to make a change to a USB connection for the new device to minimize a bandwidth requirement of the new device.

Example 16 may be any of Examples 11-15, the instructions including further instructions to provide for: determine the new device is a display; determine the attaching the display may result in an overload; determine a bandwidth reduction for the display accommodates attaching the display; influence a USB connection manager to make a change to reduce a resolution of the display; and identify the bandwidth reduction accommodates attaching the display based at least in part on at least one recommendation provided by an Artificial Intelligence monitoring the one or more device on the managed USB.

Example 17 may be any of Examples 11-16, the instructions including further instructions to provide for: provide profiles for the new device based at least on adjusting a CPU characteristic; and select the first influence based at least in part on a user preference or a system load.

Example 18 may be a method influencing one or more mode of one or more device on a Universal Serial Bus (USB) to accommodate attaching a new device to the USB, comprising: monitor for an event corresponding to attaching the new device; determine an ecosystem identifying at least one or more operational characteristic of the one or more device; determine, based at least in part on the event and the ecosystem, available influences for the mode of the one or more device; select a first influence of the available influences; identify a first target device to receive the first influence; evaluate whether applying the first influence to the target device accommodates attaching the new device to the USB; and apply the first influence to the target device.

Example 19 may be Example 18, further comprising: identify a failure to accommodate attaching the new device; select a second influence of the available influences; identify a second target device to receive the second influence; and evaluate whether applying the first and second influences accommodates attaching the new device to the USB.

Example 20 may be Example 19, further comprising: direct a selected one or more of a USB connection manager or a display driver to perform the first influence; wherein the first influence corresponds to a change to a USB connection for the new device to minimize a bandwidth requirement of the new device.

Example 21 may be any of Examples of 18-20, further comprising: determine a bandwidth reduction for the new device accommodates attaching the new device; and influence a connection manager to make a change to the mode of the new device.

Example 22 may be any of Examples 18-21, further comprising: determine the available influences based at least in part on at least one recommendation provided by an Artificial Intelligence monitoring the USB.

Example 23 may be means for any of Examples 1-22.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. One or more non-transitory computer readable media (NTCRM) comprising instructions for a policy manager to influence a mode of one or more devices on a managed converged Input-Output Universal Serial Bus (USB) to accommodate attaching a new device to the USB, wherein the instructions, when executed, are to:
monitor for an event corresponding to attaching the new device;
determine based on the event and based on a recommendation provided by an Artificial Intelligence monitoring the one or more devices, available influences for the mode of the one or more devices;
select a first influence of the available influences;
identify a first target device to receive the first influence;

perform an evaluation of whether applying the first influence to the first target device accommodates attaching the new device to the USB; and apply the first influence to the first target device.

2. The one or more NTCRM CRM of claim 1, wherein the instructions, when executed, are to:
determine, for the one or more devices, an ecosystem identifying one or more operational characteristics of the one or more devices; and
perform the evaluation based on the ecosystem.

3. The one or more NTCRM of claim 1, wherein the instructions, when executed, are to:
determine, based on the evaluation, a failure to accommodate attaching the new device;
select, responsive to the failure, a second influence of the available influences;
identify a second target device to receive the second influence; and
perform an evaluation of whether respectively applying the first and second influences to the first and second target devices accommodates attaching the new device to the USB.

4. The one or more NTCRM of claim 3, wherein the instructions, when executed, are to:
select different influences for the first and second target devices.

5. The one or more NTCRM of claim 1, wherein the instructions, when executed, are to:
influence a selected one or more of a USB connection manager or a display driver to a change a USB connection for the new device to minimize a bandwidth requirement of the new device.

6. The one or more NTCRM of claim 1, wherein the instructions, when executed, are to:
determine that the new device is a display;
determine that a bandwidth reduction for the display accommodates attaching the display to the USB;
influence a USB connection manager to change the mode of the display; and
notify, by the USB connection manager, a display driver to reduce a resolution of the display.

7. The one or more NTCRM of claim 1, wherein the instructions, when executed, are to:
select the new device to be the target device.

8. The one or more NTCRM of claim 1, wherein the instructions, when executed, are to:
determine that the attaching the first device may result in an overload; and
select the first influence to address the overload.

9. The one or more NTCRM of claim 1, wherein the instructions, when executed, are to:
provide profiles for the new device based on adjusting a central processing unit characteristic; and
select the first influence based on at least one of a user preference or a system load.

10. A system comprising at least one processor, a memory for storing instructions for a policy manager to influence a mode of one or more devices on a managed converged Input-Output Universal Serial Bus (USB) to accommodate attaching a new device to the USB, the instructions, when executed, are to:
monitor for an event corresponding to attaching the new device;
determine based on the event, available influences for the mode of the one or more devices;
select a first influence of the available influences;
identify a first target device to receive the first influence;

perform an evaluation of whether applying the first influence to the target device accommodates attaching the new device to the USB;
apply the first influence to the target device;
determine that the new device is a display;
determine that the attaching the display may result in an overload;
determine that a bandwidth reduction for the display accommodates attaching the display, based on a recommendation provided by an Artificial Intelligence monitoring the one or more devices; and
influence a USB connection manager to reduce a resolution of the display.

11. The system of claim 10, wherein the instructions, when executed, are to:
determine, for the one or more devices, an ecosystem identifying one or more operational characteristics of the one or more devices; and
perform the evaluation based on the ecosystem.

12. The system of claim 10, wherein the instructions, when executed, are to:
determine, based on the evaluation, a failure to accommodate attaching the new device;
select, responsive to the failure, a second influence of the available influences;
identify a second target device to receive the second influence; and
perform an evaluation of whether respectively applying the first and second influences to the first and second target devices accommodates attaching the new device to the USB.

13. The system of claim 12, wherein the instructions, when executed, are to:
select different influences for the first and second target devices.

14. The system of claim 13, wherein the instructions, when executed, are to:
influence a selected one or more of a USB connection manager or a display driver to change a USB connection for the new device to minimize a bandwidth requirement of the new device.

15. The system of claim 10, wherein the instructions, when executed, are to:
provide profiles for the new device based on adjusting a central processing unit characteristic; and
select the first influence based on at least one of a user preference or a system load.

16. A method for influencing a mode of one or more devices on a Universal Serial Bus (USB) to accommodate attaching a new device to the USB, the method comprising:
monitoring for an event corresponding to attaching the new device;
determining an ecosystem identifying one or more operational characteristics of the one or more devices;
determining, based on the event and the ecosystem, and a recommendation provided by an Artificial Intelligence monitoring the USB, available influences for the mode of the one or more devices;
selecting a first influence of the available influences;
identifying a first target device to receive the first influence;
evaluating whether applying the first influence to the target device accommodates attaching the new device to the USB; and
applying the first influence to the target device.

17. The method of claim 16, further comprising:
identifying a failure to accommodate attaching the new device;
selecting a second influence of the available influences;
identifying a second target device to receive the second influence; and
evaluating whether applying the first and second influences accommodates attaching the new device to the USB.

18. The method of claim 17, further comprising:
directing a selected one or more of a USB connection manager or a display driver to perform the first influence;
wherein the first influence corresponds to a change to a USB connection for the new device to minimize a bandwidth requirement of the new device.

19. The method of claim 16, further comprising:
determining a bandwidth reduction for the new device accommodates attaching the new device; and
influencing a connection manager to change the mode of the new device.

20. The one or more NTCRM of claim 1, wherein the Artificial Intelligence is communicatively coupled with one or more information sources including at least one of user settings, system load, a database of profile data, communications to/from a graphics library, a connection manager, or a display driver.

21. The system of claim 10, wherein the Artificial Intelligence is communicatively coupled with one or more information sources including at least one of user settings, system load, a database of profile data, communications to/from a graphics library, a connection manager, or a display driver.

22. The method of claim 16, wherein the Artificial Intelligence is to analyze data from one or more information sources associated with the ecosystem.

* * * * *